US007454206B1

(12) United States Patent
Phillips et al.

(10) Patent No.: US 7,454,206 B1
(45) Date of Patent: Nov. 18, 2008

(54) METHOD AND SYSTEM WITH USER IDENTIFIERS THAT INDICATE SESSION TYPE

(75) Inventors: Jeffrey F. Phillips, Lee's Summit, MO (US); Bill A. Hinds, Roeland Park, KS (US); John David Ehrsam, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1089 days.

(21) Appl. No.: 10/439,104

(22) Filed: May 15, 2003

(51) Int. Cl.
*H04Q 7/20* (2006.01)
(52) U.S. Cl. .................. 455/435.1; 455/432.1; 370/352
(58) Field of Classification Search .................. 455/406
See application file for complete search history.

(56) References Cited

U.S. PATENT DOCUMENTS

| | | | |
|---|---|---|---|
| 5,670,950 A | 9/1997 | Otsuka .................. 340/825.33 |
| 6,097,937 A | 8/2000 | Sawyer ........................ 455/406 |
| 6,173,171 B1 | 1/2001 | Plush et al. .................. 455/408 |
| 6,259,906 B1 | 7/2001 | Carlsson et al. ............. 455/403 |
| 6,282,274 B1 | 8/2001 | Jain et al. .................... 379/114 |
| 6,308,267 B1 | 10/2001 | Gremmelmaier ............ 713/168 |
| 6,463,275 B1 | 10/2002 | Deakin ........................ 455/406 |
| 6,853,630 B1 * | 2/2005 | Manning ..................... 370/338 |
| 7,130,629 B1 * | 10/2006 | Leung et al. ............. 455/435.1 |
| 7,257,402 B2 * | 8/2007 | Khalil et al. ............. 455/435.1 |
| 2002/0013849 A1 | 1/2002 | Schweitzer et al. .......... 709/227 |
| 2002/0087682 A1 | 7/2002 | Roach ........................ 709/224 |
| 2002/0176378 A1 | 11/2002 | Hamilton et al. ............ 370/328 |
| 2004/0009761 A1 * | 1/2004 | Money et al. ................ 455/406 |

FOREIGN PATENT DOCUMENTS

WO     WO 02/073991 A1     9/2002

OTHER PUBLICATIONS

U.S. Appl. No. 10/861,562, filed Jun. 4, 2004, Zhou et al.
di Flora, Cristiano "Differentiated Services (DiffServ): Seminar on transport of multimedia streams over the wireless internet," University of Helsinki, appears to be dated Nov. 5, 2003.
Aboba, B., Request for Comments ("RFCs") 2486, "The Network Access Identifier," Jan. 1999.
Rigney, C., Request for Comments 2866, "RADIUS Accounting," Jun. 2000.
Rigney, C., et al., Request for Comments 2865, Remote Authentication Dial In User Service (RADIUS), Jun. 2000.
"Hp OpenView internet usage manager 4.1 CDMA solution product brief," Hewlett Packard, Aug. 2002.
3rd Generation Partnership Project 2, "Wireless IP Network Standard", 3GPP2 P.S0001-A, Version 3.0, Jul. 16, 2001.

* cited by examiner

*Primary Examiner*—Creighton H Smith

(57) ABSTRACT

A user uses a wireless communication device to engage in a communication session over a packet-switched network. The communication session is one of a plurality of different session types, e.g., a push-to-talk (PTT) session or a Web browsing session. The user is identified in the communication session by a user identifier that is dependent on the session type. The user identifier used in a particular communication session is included in a usage record generated for that communications session. A billing system determines the session type from the user identifier in the usage record. Based on this session type, the billing system selects a billing formula to calculate a charge to the user for the communication session.

19 Claims, 5 Drawing Sheets

METHOD AND SYSTEM WITH USER IDENTIFIERS THAT INDICATE SESSION TYPE

BACKGROUND

1. Field of the Invention

The present invention relates to telecommunications and, more particularly, to methods and systems for using different user identifiers for different types of communication sessions.

2. Description of Related Art

Increasingly, wireless service providers are providing users with access to packet-switched networks, such as the Internet, in addition to circuit-switched voice calls. Moreover, users may engage in different kinds of communication sessions over the packet-switched network. For example, a user may be able engage in Web browsing sessions or in real-time media sessions, such as "push-to-talk" (PTT) sessions. These different types of communication sessions may place differing demands on network resources, may result in differing levels of interest in different types of users, and may be marketed in different ways. As a result, it may be desirable for a wireless service provider to use different criteria to calculate charges for different types of communication sessions. For example, a wireless service provider may charge based on air time or the amount of data transferred for certain types of communications sessions but may charge a flat rate for other types of communications sessions.

However, in third-generation (3G) wireless communication networks, charges to users are typically calculated based on information contained in Usage Data Records (UDRs), which are generated by packet data serving nodes (PDSNs) and stored by accounting servers. The format of such UDRs is specified in "Wireless IP Network Standard," 3GPP2 P.S0001-A. As set forth in that standard, a UDR identifies the user by a network access identifier (NAI) and may include other information such as connect time information and the amount of data transferred. However, the UDR format does not provide an identification of the type of communication session.

Accordingly, there is a need to provide information regarding the type of communication sessions a user engages in, for billing or other purposes.

SUMMARY

In a first principal aspect, an exemplary embodiment of the present invention provides a method of communicating over a packet-switched network. In accordance with the method, an instruction to establish a communication session over a packet-switched network on behalf of a user is received. The communication session has a session type. One of a plurality of user identifiers associated with the user is selected based at least in part on the session type. The communication session is established using the selected user identifier to identify the user.

In a second principal aspect, an exemplary embodiment of the present invention provides a wireless communication device. The wireless communication device comprises a user interface for receiving an instruction to establish a requested communication session, having a requested session type, over a packet-switched network on behalf of a user; data storage storing a plurality of user identifiers associated with the user; selection logic for selecting one of the plurality of user identifiers, based at least in part on the requested session type; and at least one application establishing the requested communication session of the requested session type. The at least one application uses the selected user identifier to identify the user for the requested communication session.

In a third principal aspect, an exemplary embodiment of the present invention provides a method of obtaining session type information, e.g., for billing or other purposes. In accordance with the method, a communication session over a packet-switched network is established on behalf of a user. The communication session has a session type. A user identifier that identifies the user for the communication session is obtained. The session type is determined from the user identifier.

DETAILED DESCRIPTION OF EXEMPLARY EMBODIMENTS

The present invention, in exemplary embodiments, addresses the need for making session type information more readily available by providing a user with different user identifiers for different session types. Thus, a user may be identified by a first user identifier when engaged in a first type of communication session, such as a PTT session, and may be identified by a second user identifier when engaged in a second type of communication session, such as a Web browsing session. As a result, the UDRs or other usage records generated and stored for a user's communication session may include a user identifier that indicates the session type as well as identifies the user. A billing system may obtain information from the usage records for a user's communication session, and, in particular, may determine the session type from the user identifier contained in the usage records. The billing system may then select a billing formula based on the determined session type and use the selected billing formula to calculate a charge to the user for the communication session. In this way, a wireless service provider may charge a user differently for different types of communication sessions.

EXEMPLARY NETWORK ARCHITECTURE

Figure 1:
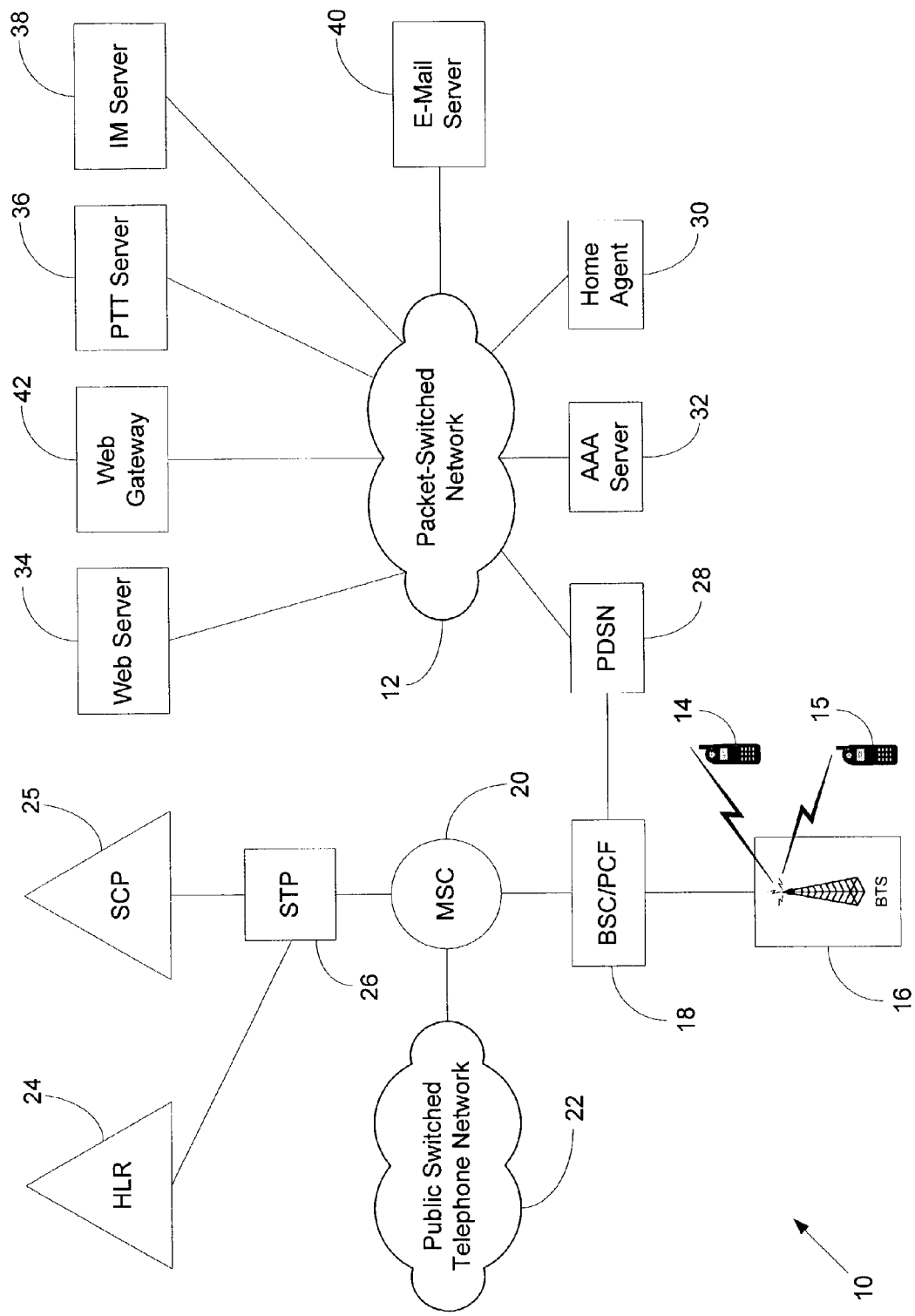
FIG. 1 is a simplified block diagram of a wireless telecommunications system, in accordance with an exemplary embodiment of the present invention.

Referring to the drawings, FIG. 1 is a simplified block diagram of an exemplary telecommunications system 10 in which exemplary embodiments of the present invention may be employed. Telecommunications system 10 includes a packet-switched network 12. Packet-switched network 12 may include one or more wide area networks (WANs) and/or one or more local area networks (LANs). Packet-switched network 12 may include one or more public networks, such as the Internet, and/or one or more private networks. Packets may be routed in packet-switched network 12 using the Internet Protocol, and devices in communication with packet-switched network 12 may be identified by a network address, such as an Internet Protocol (IP) address.

A user may use a wireless communication device, such as wireless communication device 14 or 15, for communicating over packet-switched network 12. Wireless communication devices 14 and 15 may be portable wireless devices, such as wireless telephones, personal digital assistant (PDA), wirelessly equipped laptop computers, and/or other devices that communicate over an air interface. To provide service to communication devices, such as communication device 14, wireless telecommunications system 10 may includes a base transceiver station (BTS) 16 that provides a wireless coverage area. BTS 16 may communicate over an air interface with one or more wireless communication devices, such as wireless communication devices 14 and 15, located in this wireless coverage area. The communications between BTS 16 and wireless devices 14 and 15 may occur in a digital format, such as CDMA, TDMA, GSM, or 802.11x, or they may occur in an analog format, such as AMPS. A preferred wireless communications format is "cdma2000," such as described in EIA/TIA/IS-2000 Series, Rev. A (published March 2000), which is incorporated herein by reference.

BTS 16 may be controlled by a base station controller (BSC) 18, which, in turn, may be controlled by a mobile switching center (MSC) 20. MSC 20 may be connected to the public switched telephone network (PSTN) 22. MSC 20 may able to communicate with a home location register (HLR) 24 and a service control point (SCP) 25, typically, via one or more signal transfer points (STPs), such as STP 26. Although FIG. 1 shows MSC 20 connected to one BSC and shows BSC 18 connected to one BTS, in general, MSC 20 may be connected to more than one BSC and each BSC, such as BSC 18, may be connected to more than one BTS.

MSC 20 may use a signaling system, such as SS7, to route calls through PSTN 22. The signaling between MSC 20 and HLR 24 may conform to IS-41 specifications. A recent revision of the IS-41 specifications, ANSI/TIA/EIA-41-D-97, published in December 1997, is incorporated herein by reference. The signaling between MSC 20 and SCP 25 may conform to the specification "Wireless Intelligent Network," TIA/EIA/IS-771, published in July 1999, which is incorporated herein by reference. Other signaling protocols could be used, however. By the use of such signaling, MSC 20, BSC 18, and BTS 16 may be able to connect incoming calls from PSTN 22, which calls may originate from landline telephones, mobile stations, or other communication devices, to wireless communication devices 14 and 15. Similarly, MSC 20, BSC 18, and BTS 16 may be able to connect calls originating from wireless communication devices 14 and 15 through PSTN 22.

In some cases, wireless communication devices 14 and 15 may use packet-switched network 12 but not PSTN 22 for communication. However, wireless communication devices 14 and 15 may still use MSC 20 and HLR 24 for purposes of authentication for access to wireless resources. For example, when wireless communication device 14 requests a wireless traffic channel, MSC 20 may send an IS-41 authentication request to HLR 24 to authenticate the request.

To provide wireless communication devices, such as wireless communication devices 14 and 15, access to packet-switched network 12, BSC 18 may include a packet control function (PCF), and a packet data serving node (PDSN) 28 may connect BSC/PCF 20 to packet-switched network 12. The communications between BSC/PCF 18, MSC 20, and PDSN 28 may conform to "third generation" (3G) wireless network specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference. Briefly stated, under these 3G specifications, when wireless communication device 14 requests access to packet-switched network 12, BSC/PCF 18 may engage in signaling with MSC 20 and with PDSN 28 to set up a data link with PDSN 28. If this process is successful, a point-to-point protocol (PPP) data link is established between wireless communication device 14 and PDSN 28. PDSN 28 may then act as a network access server, providing wireless communication device 14 access to packet-switched network 12.

Alternatively or additionally, telecommunications system 10 may include other network elements for providing wireless communication device 14 access to packet-switched network. For example, wireless telecommunication system 10 may include an interworking function (IWF) connected between MSC 20 and packet-switched network 12.

A wireless communication device communicatively coupled to packet-switched network 12 is typically identified by a network address, such as an IP address. The IP address may be dynamically assigned using either a Simple IP process or a Mobile IP process. In a Simple IP process, PDSN 28 dynamically assigns an IP addresses to a wireless communication device, such as wireless communications device 14, when a data link is established with it.

In a Mobile IP process, PDSN 28 may transmit a registration request to a home agent 30 associated with wireless communication device 14. If home agent 30 approves the registration request, home agent 30 may dynamically assign an IP address to wireless communication device 14, or wireless communication device 14 may use an IP address permanently assigned to it. Relevant aspects of Mobile IP are described in C. Perkins, "IP Mobility Support," Request for Comments 2002 (October 1996) and P. Calhoun and C. Perkins, "Mobile IP Network Access Identifier Extension for Ipv4," Request for Comments 2794 (March 2000), which are incorporated herein by reference.

PDSN 28 may also exchange messages with an authentication, authorization, and accounting (AAA) server 32, e.g., via packet-switched network 12. This communication may conform to RADIUS protocols, such as specified in "Remote Authentication Dial In User Service (RADIUS)," Request For Comments 2865 (June 2000) and "RADIUS Accounting," Request For Comments 2866 (June 2000), which are incorporated herein by reference. Other protocols could be used, however.

PDSN 28 may query AAA server 32 to authenticate and authorize requests by wireless communication devices, such as wireless communication device 14, for access to packet-switched network 12. PDSN 28 may also send to AAA server 32 status messages, such as RADIUS Accounting START and STOP messages, regarding the communication status of wireless communication devices. In particular, PDSN 28 may send a RADIUS Accounting START message when PDSN 28 starts a service period for wireless communication device 14, such as when a new data link is established or when an existing data link that was dormant becomes active. In addition, PDSN 28 may send a RADIUS Accounting STOP message when the data link of wireless communication device 14 becomes dormant (which may occur when no data traffic to or from wireless communication device 14 occurs for a certain period of time, such as ten seconds) or when the data link of wireless communication device 14 has terminated (which may occur when wireless communication device 14 logs off, powers off, moves out of range, or is inactive for a sufficient period of time). A RADIUS Accounting STOP message may also indicate whether the data link with wireless communication device 14 has ended or is simply dormant, i.e., is being continued. The RADIUS Accounting START and STOP messages may include UDRs or other usage records generated by PDSN 28 regarding the communication status of wireless communication device 14, as described in more detail below.

Wireless communication device 14 may engage in various types of communication sessions over packet-switched network 12. For example, wireless communication device 14 may engage in a Web browsing session. The Web browsing may involve communications with one or more Web servers, such as Web server 34, using a protocol such as the HyperText Transfer Protocol (HTTP). A recent version of HTTP is described in "Hypertext Transfer Protocol—HTTP/1.1," Request for Comments 2616 (June 1999), which is incorporated herein by reference.

As another example, wireless communication device 14 may engage in a real-time media session, such as a "push-to-talk" (PTT) session, with another device, such as wireless communication device 15. Voice, video, graphics, data, and/or other media may be exchanged during such real-time media sessions. Packet-switched network 12 may carry such media in a real-time packet format, e.g., using a protocol such as the real-time transport protocol (RTP). Relevant aspects of RTP are described in Schulzrinne, et al., "RTP: A Transport Protocol for Real-Time Applications," Request for Comments 1889 (January 1996), which is incorporated herein by reference. Such real-time media sessions may be intermediated by one or more network elements, such as PTT server 36. In particular, PTT server 36 may engage in signaling, e.g., using the Session Initial Protocol (SIP), to set up real-time media sessions. Relevant aspects of SIP are described in J. Rosenberg, et al., "SIP: Session Initiation Protocol," Request For Comments 3261 (June 2002), which is incorporated herein by reference.

Wireless communication device 14 could also engage in other types of communication sessions. For example, wireless communication device 14 could engage in instant messaging sessions to send instant messages to one or more other devices, such as wireless device 15. Such instant messaging may be intermediated by one or more network elements, such as instant message (IM) server 38. As another example, wireless communication device 14 may engage in e-mail sessions with an e-mail server 40 to send and receive e-mail messages. Wireless communication device 14 could also engage in other types of communication sessions in addition to or instead of the foregoing, and, such communication sessions may involve communications with Web server 34, PTT server 36, IM server 38, e-mail server 40, and/or other network elements.

The communication sessions of wireless communication device 14 may also go through one or more gateways. For example, in Web browsing sessions, wireless communication device 14 may communicate with Web server 34 via a Web gateway 42. Web gateway 42 may transcode or render content from Web servers, such as Web server 34, to tailor it for the particular wireless communication device that requested it. For example, Web gateway 42 may apply a profile of a particular device's capabilities and preferences to tailor content for that device. Web gateway 42 may also perform other functions. For example, in some embodiments wireless communication device 14 may communicate with Web server 34 using the Wireless Application Protocol (WAP), in which case Web gateway 42 may function as a WAP proxy or gateway. Web gateway 42 may also serve as a gateway for wireless communication device 14 in other types of communication sessions, e.g., communication sessions involving IM server 38 or e-mail server 40. Although Web gateway 42 is shown as one network element in FIG. 1, content gateway 42 may be a distributed system made up of multiple servers, proxies, and/or gateways.

EXEMPLARY WIRELESS COMMUNICATION DEVICE

Figure 2:
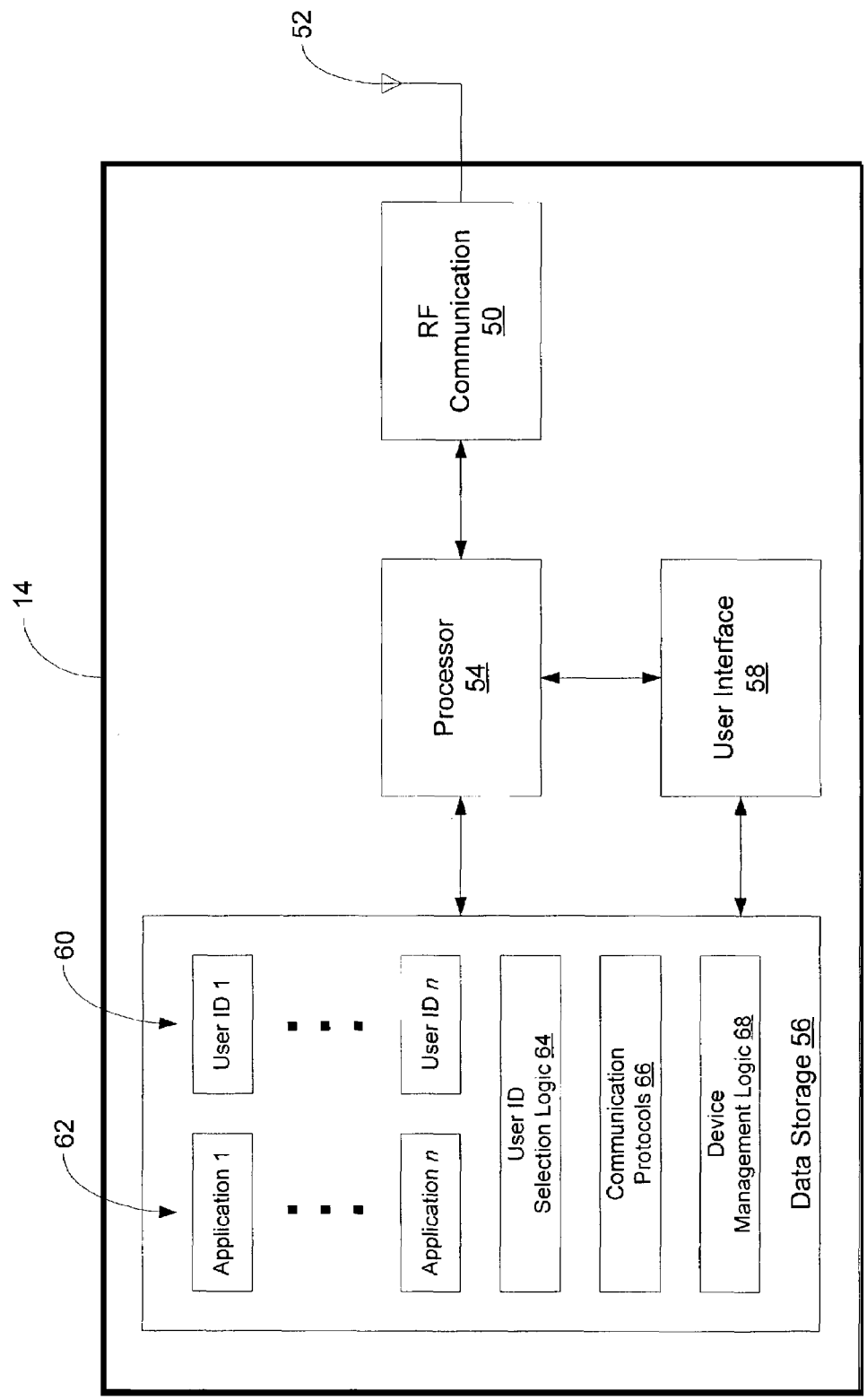
FIG. 2 is a simplified block diagram of a wireless communication device, in accordance with an exemplary embodiment of the present invention.

FIG. 2 is a simplified block diagram of wireless communication device 14, in accordance with an exemplary embodiment. Wireless communication device 14 includes a radio frequency (RF) communication block 50 connected to an antenna 52. RF communication block 50 may include one or more transceivers and/or other components for RF communications. Wireless communication device also includes at least one processor 54 that may control many of its operations. More particularly, processor 54 may control the operations of wireless communications device 14 by executing machine language instructions stored in data storage 56, as described in more detail below. Data storage 56 may include volatile memory, such as RAM, and/or non-volatile memory, such as Flash ROM.

Wireless communication device 14 may also include a user interface 58 coupled to processor 54 and data storage 56. User interface 58 may include one or more input devices with which the user may interact to provide input to wireless communication device 14. Such input devices may include microphones, keys, buttons, switches, touch screens, and/or other components with which a user may provide input. User interface 58 may also include one or more output devices, such as speakers, lights, display screens, vibration mechanisms, and/or other components that provide an output discernible to the user.

In addition to machine language instructions executable by processor 54, data storage 56 may store other information, such as various parameters used for wireless communication. Such parameters may be provisioned in data storage 56 for a particular user. For example, data storage 56 may store a plurality of user identifiers 60, i.e., User ID 1 through User ID n, that uniquely identify a particular user. In many cases, the user may not be aware of or have access to all of the plurality of user identifiers 60. For example, the user may be aware of only User ID 1. Thus, wireless communication device 14 may use different user identifiers to identify the user in different communication sessions without the user's knowledge.

The machine language instructions stored in data storage 56 may include various functional components. In particular, the machine language instructions may include a plurality of applications 62, i.e., Application 1 through Application n, for different types of communication sessions. For example, applications 62 may include a Web browser for Web browsing applications, a PTT client for PTT sessions, an IM client for instant messaging sessions, and/or other applications for other types of communication sessions. As described in more detail below, different applications 62 may use different user identifiers 60 to identify the user in different types of communication sessions. Although FIG. 2 shows the same number of applications 62 as user identifiers 60, data storage 56 may store a different number. For example, a given user identifier may be used for more than one application. In addition, a given application may use different user identifiers under different circumstances.

Accordingly, data storage 56 may include User ID selection logic 64 that selects which one of user identifiers 60 to use in a particular communication session. As described in more detail below, selection logic 64 may select the user identification based at least in part on the type of communication session in which the user is to be identified.

The machine language instructions stored in data storage 56 may also include other functional components. For example, data storage 56 may store communication protocols 66 that may be used by one or more of applications 62. Communication protocols 66 may, for example, include cdma2000, SIP, HTTP, RTP, UDP, TCP, IP, and/or PPP. Data storage 56 may also store device management logic 68, which may manage other aspects of wireless communication device 14, such as user interface 58.

EXEMPLARY OPERATION

Figure 3:
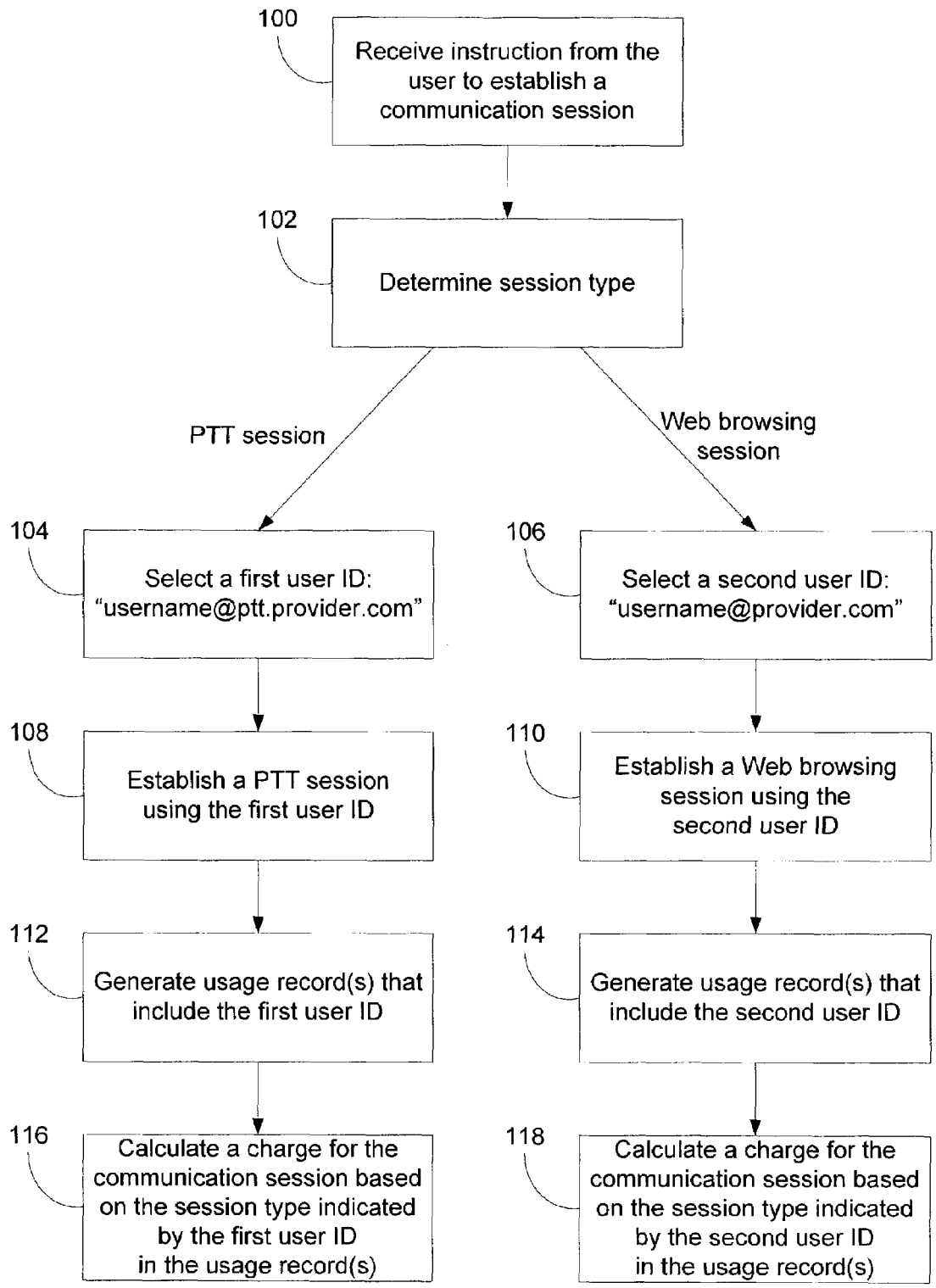
FIG. 3 is a flow chart illustrating a method of using a plurality of different user identifiers, in accordance with an exemplary embodiment of the present invention.

FIG. 3 is a flow chart illustrating an exemplary method of using a plurality of different user identifiers. The method may begin when an instruction from the user to establish a communication session is received, as indicated by block 100. For example, a user may have interacted with user interface 58 so as to instruct wireless device communication 14 to initiate a new communication session, or, to accept an invitation for a communication session from another user. The communication session may be, for example, a PTT session, Web browsing session, instant messaging session, e-mail session, or some other type of communication session over packet-switched network 12.

A determination of the session type is made, as indicated by block 102. The session type may be determined on the basis of the particular application used for the communication session, e.g., which of applications 62 is being invoked. Alternatively, the determination may be made based on what communication protocols are used, e.g., whether SIP or HTTP is being used. Other criteria could be used to determine the session type.

A user identifier is selected based at least in part on the session type that is determined. For example, if the communication session is a real-time media session, such as a PTT session, then a first user identifier may be selected, as indicated by block 104. If the communication session is other than a real-time media session, e.g., a Web browsing session, then a second user identifier is selected, as indicated by block 106. The second user identifier could be used for only Web browsing sessions. Alternatively, the second user identifier could be used for any session that is not a PTT session, e.g., the second user identifier could be used for both Web browsing and instant messaging sessions.

In an exemplary embodiment, the first and second user identifiers are network access identifiers (NAIs). NAIs are described in B. Aboba, "The Network Access Identifier," Request for Comments 2486 (January 1999), which is incorporated herein by reference. In particular, an NAI is a text string in the form of "username@realm" with various requirements for what characters can appear in the "username" and in the "realm." As indicated by blocks 104 and 106, the first and second user identifiers, as NAIs, may have the same username but different realms. Moreover, the different realms may differ only in part. Thus, the first user identifier, e.g., to identify the user in a PTT session, may be in the form of "username@ptt.provider.com" with "provider" corresponding to the user's wireless service provider. The second user identifier, e.g., to identify the user in a Web browsing session, may be in the form of "username@provider.com". Thus, a user identifier may include a first field that identifies the user (e.g., the "username" in an NAI) and a second field that indicates a session type (e.g., the "realm" in an NAI). Although the user identifiers may conform to the NAI format, other formats could be used.

In the PTT case, a PTT session is established, using the first user identifier to identify the user, as indicated by block 108. In the Web browsing case, a Web browsing session is established, using the second user identifier to identify the user, as indicated by block 110. Establishing the communication session may involve a communication device, such as wireless communication device 14, transmitting one or more messages that include the relevant user identifier, as described in more detail below.

The user, using a communication device such as wireless communication device 14, then engages in the communication session, e.g., a PTT session or a Web browsing session, and the user is identified by the user identifier corresponding to that type of communication session. One advantage of the user being identified by a particular user identifier during this communication session is that system 10 may be configured so that it does not transmit to the user's communication device packets that are associated with the user's other user identifiers. Using different user identifiers for different types of communication sessions can, thus, result in a higher quality of service for the communication sessions. For example, if a user is engaged in a PTT session, wherein the user is identified by the user's first user identifier, the real-time media in the PTT session may beneficially remain uninterrupted by instant messages, because instant messages may be associated with the user's second user identifier. Instead of interrupting the user's PTT session by transmitting instant messages to the communication device being used for the PTT session, system 10 may store any instant messages directed to the user or may indicate that the user is unavailable. Thus, by providing a user identifier that indicates only real-time media sessions, such as PTT sessions, the user's communication device when engaged in a real-time media session may receive only packets related to the real-time media session and will not be interrupted by other packets. In this way, the quality of the voice or other media will not be degraded by the presence of other packets intermingled with the real-time media packets.

When the user engages in the communication session, one or more usage records may be generated for the communication session. In the PTT case, one or more usage records that include the first user identifier are generated for the PTT session, as indicated by block 112. In the Web browsing case, one or more usage records that include the second user identifier are generated for the Web browsing session, as indicated by block 114. These usage records may be in the format of Usage Data Records (UDRs) as specified in "Wireless IP Network Standard," 3GPP2 P.S0001-A. Alternatively, the usage records may be in some other format. In addition to user identifiers, the usage records may include other information. For example, a usage record may also identify the wireless communication device, e.g., by a mobile station identification (MSID), and may include a network address, such as an IP address, that can be used to route packets to the wireless communication device. The usage record may also include information about the communication session, such as time information and the number of data packets transmitted to and from the wireless communication device. A usage record may be generated at the beginning of, at the end of, and/or at various times during a communication session. In an exemplary embodiment, PDSN 28 may generate usage records and transmit them in RADIUS Accounting START and STOP messages to AAA server 32. Thus, a plurality of usage records may be generated for a given communication session. AAA server 32 may, in turn, store these usage records for later use, such as by a billing system.

The usage records may be used in various ways after they are generated. For example, the usage records may be used for billing purposes. In particular, a charge to a user for a communication session may be calculated from the usage records related to that communication session. Different billing formulas may be used to calculate charges, depending on session type. Different billing formulas may differ in terms of the types of information used to determine a charge for a communication session, e.g., air time, amount of data transmitted or received, or flat rate, and/or the rates used to calculate charges. In any event, the usage records generated for a communication session may contain much of the information needed to calculate the charge for the communication session. In particular, the session type for a communication session may be determined from the user identifier included in the usage records for the communication session. The billing formula may then be selected based at least in part on the session type. To the extent that the charge is based on time or amount of data transferred, this information may also be obtained from usage records. Thus, as indicated by block 116, the charge for a PTT session may be calculated using a billing formula for the PTT session type, this session type being indicated by the first user identifier in the usage record(s) for the communication session. Similarly, as indicated by block 118, the charge for a Web browsing session may be calculated using a billing formula for the Web browsing session type, this session type being indicated by the second user identifier in the usage record(s) for the communication session.

Although in the example illustrated in FIG. 3 the user is associated with two user identifiers that indicate distinct session types, the user may be associated with a greater number of user identifiers. In addition, although the user identifiers in the example illustrated in FIG. 3 indicated a PTT session type and a Web browsing session type, the user identifiers could indicate other session types in addition to or instead of these two exemplary session types.

Figure 4:
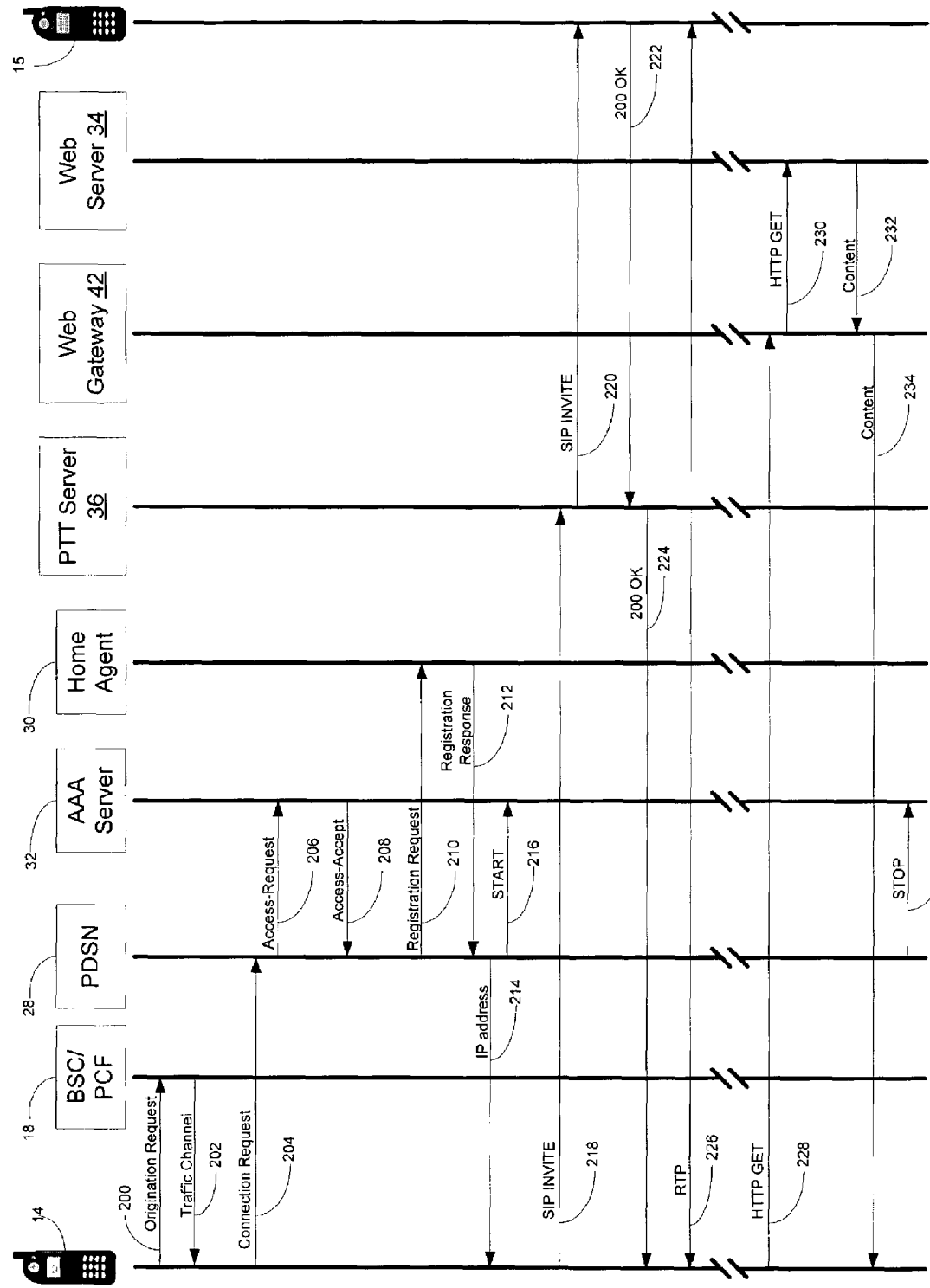
FIG. 4 is a call flow diagram illustrating a process for establishing and engaging in communication sessions, in accordance with an exemplary embodiment of the present invention.

FIG. 4 is a simplified call flow diagram illustrating an exemplary process for establishing and engaging in communication sessions. The process may begin when wireless communication device 14 transmits an origination message, as indicated by step 200. Wireless communication device 14 may transmit the origination message in a wireless access channel in order to request access to a wireless traffic channel. The origination message of step 200 may identify wireless communication device 14, e.g., by mobile station identification (MSID), mobile identification number (MIN), and/or electronic serial number (ESN). The origination message of step 200 may also include other information to authenticate wireless communication device 14 for access to a wireless traffic channel. In particular, signaling may occur in response to the origination message of step 200, such as IS-41 signaling with HLR 24, to authenticate wireless communication device 14 for access to radio resources. If wireless communication device 14 is authenticated, then BSC/PCF 18 may assign wireless communication device 14 to a wireless traffic channel, as indicated by step 202.

Wireless communication device 14 may then transmit a connection request to establish a data link with PDSN 28, as indicated by step 204. The connection request of step 204 may include a password and a user identification that is dependent on the particular type of communication session that wireless communication device 14 is trying to establish. For example, the user identifier may be "username@ptt.provider.com" if wireless communication device 14 is trying to establish a PTT session and may be "username@provider.com" if wireless communication device 14 is trying to establish some other type of communication session, such as a Web browsing session.

For purposes of authentication for access to packet-switched network 12, PDSN 28 may send the user identifier and password from step 204 to AAA server 32 in a RADIUS Access-Request message, as indicated by step 206. In this example, AAA server 32 determines that the user identifier and password are valid and so signals PDSN 28 in a RADIUS Access-Accept message, as indicated by step 208.

In this example, wireless communication device 14 uses Mobile IP and is assigned to home agent 30. Accordingly, in step 210, PDSN 28 sends a Mobile IP Registration Request that includes the user identifier to home agent 30. In response, home agent 30 dynamically assigns an IP address to wireless communication device 14. In step 212, home agent 30 sends PDSN 28 a Mobile IP Registration Response that includes the IP address dynamically assigned to wireless communication device 14. In the Simple IP case, PDSN 28 may dynamically assign an IP address to wireless communication device 14 without the involvement of home agent 30. In either the Mobile IP or Simple IP case, PDSN 28 may transmit the dynamically assigned IP address to wireless communication device 14, as indicated by step 214.

PDSN 28 also sends a RADIUS Accounting START message to AAA server 32 to signal that data service to wireless communication device 14 has started, as indicated by step 216. The START message of step 216 includes the user identifier that wireless communication device 14 transmitted in the connection request of step 204, i.e., a user identifier that is dependent on the type of communication session. The START message of step 216 may also include other information, which may be in the format of a UDR or other usage record.

Wireless communication device 14 may then transmit one or more messages that may depend on the type of communication session. Steps 218-226 in FIG. 4 illustrate an exemplary call flow for a PTT session with wireless communication device 15. In the PTT case, wireless communication device 14 may transmit a SIP INVITE message to PTT server 36 specifying that a PTT session with wireless communication device 15 is requested, as indicated by step 218. The SIP INVITE of step 218 may include the user identifier for PTT sessions, e.g., "username@ptt.provider.com". PTT server 36 may then send a SIP INVITE message to wireless communication device 15, as indicated by step 220. In the process of delivering the SIP INVITE message to wireless communication device 15, a UDR or other usage record may also be generated for wireless communication device 15, e.g., by PDSN 28 or by a different PDSN in system 10, and transmitted to an accounting server, such as AAA server 32, in a RADIUS Accounting START message. This usage record may include a user identifier for wireless communication device 15 that may also be dependent on the type of communication session.

If wireless communication device 15 accepts the PTT session that is being invited, it may transmit a SIP 200 OK message to PTT server 36, as indicated by step 222. In response to the 200 OK message of step 222, PTT server 36 may send wireless communication device 14 a SIP 200 OK message, as indicated by step 224. After appropriate acknowledgement messages, a PTT session may be established between wireless communication devices 14 and 15. Thus, wireless communication devices 14 and 15 may exchange media, for example, using RTP, as indicated by step 226. For this PTT session, PTT server 36 may generate UDRs or other usage records that may include the user identifiers used by wireless communication devices 14 and 15 for this PTT session.

Steps 228-234 illustrate an exemplary call flow for a Web browsing session. As indicated by step 228, wireless customer device 14 may send an HTTP GET request that includes a Uniform Resource Locator (URL) that corresponds to Web server 34. The HTTP GET request may also include the user identifier for Web browsing sessions, e.g., "username@provider.com". Web gateway 42, acting as a proxy server or other type of intermediary, may receive the HTTP GET request of step 228. In response, Web gateway 42 may validate the request and obtain a user profile associated with the user identifier. Web gateway may then forward the HTTP GET request to Web server 36, as indicated by step 230.

Web server 36 may respond with the content associated with the URL, as indicated by step 232. Web gateway 42, in turn, sends the content to wireless communication device 14, as indicated by step 234. In so doing, Web gateway 42 may tailor the content provided to wireless communication device 14 based on the user profile associated with the user identifier. This tailoring may include transcoding or rendering the content to accommodate the particular capabilities of wireless communication device 14 and/or the particular preferences of the user. Wireless communication device 14 may continue the Web browsing session by sending another HTTP GET request, for example, with another URL that may correspond to Web server 34 or to another Web server. For this Web browsing session, Web gateway 42 may generate UDRs or other usage records that include the user identifier used by wireless communication device 14 for this Web browsing session.

When the PTT session, Web browsing session, or other communication session of wireless communication device 14 ends, PDSN 28 may send a RADIUS Accounting STOP message to AAA server 32, as indicated by step 236. The STOP message may include a UDR or other usage record that includes the user identifier that wireless communication device 14 used for the communication session. The UDR or other usage record may also include other information, such as start time, stop time, and counts of the data transmitted to and from wireless communication device 14. In some cases, PDSN 28 may send a RADIUS Accounting STOP message even before the communication session ends. This may occur, for example, because the data link of wireless communication device 14 may become dormant, i.e., wireless communication device 14 may lose its wireless traffic channel if wireless communication device 14 has been inactive for even a short period of time, such as ten seconds. In that case, the STOP message may include an indication that the data link is being continued. Thus, one or more periods of inactivity during a given PTT session, Web browsing session, or other communication session may result in more than one START message and more than one STOP message.

Figure 5:
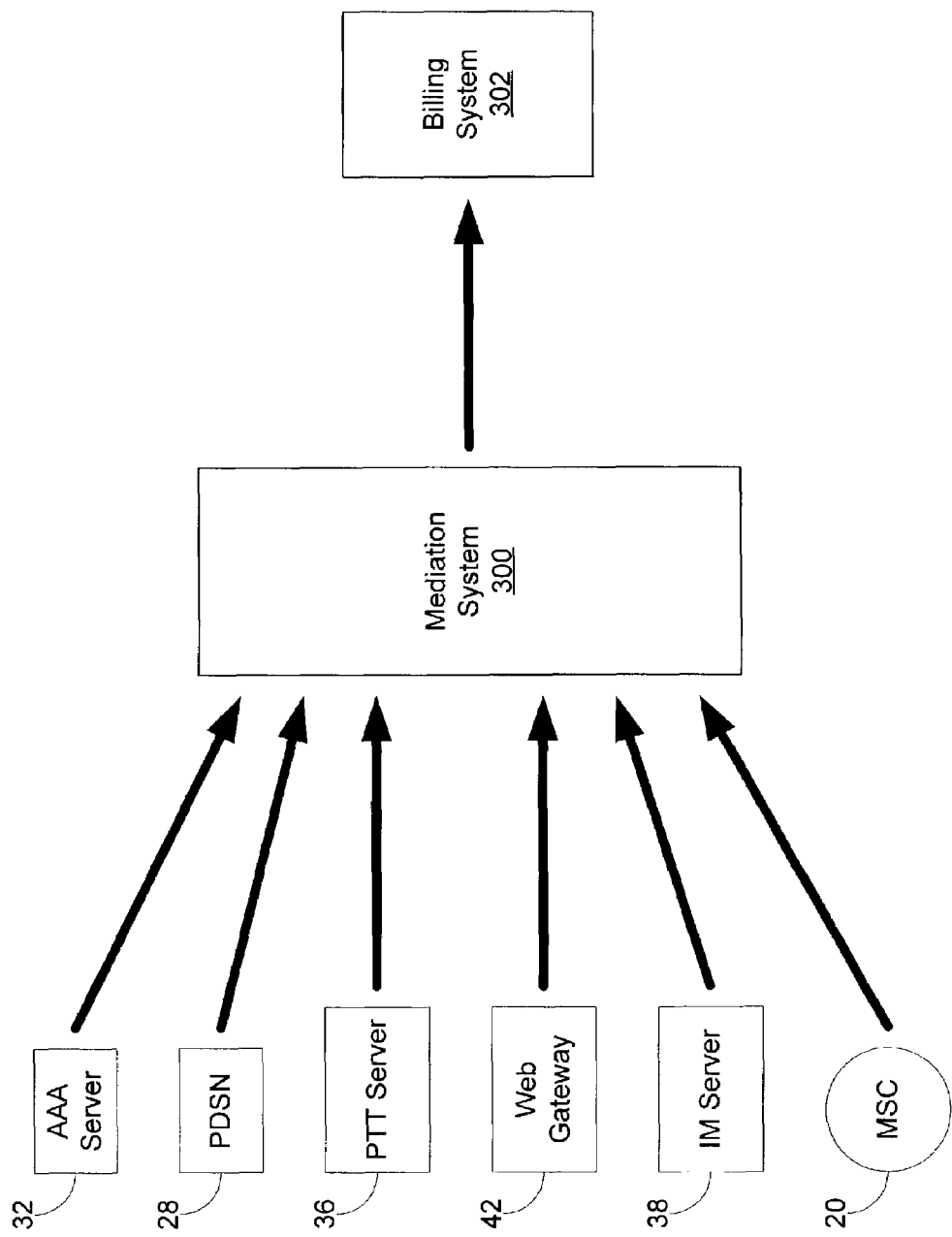
FIG. 5 is a simplified block diagram illustrating how usage records may be used for billing purposes, in accordance with an exemplary embodiment of the present invention.

As described above, PDSN 28 may generate usage records, such as UDRs, for communication sessions, and AAA server 32 may receive them and store them. In addition, PTT server 36 may generate and store usage records, such as UDRs, for PTT sessions, and Web server 42 may generate and store usage records, such as UDRs, for Web browsing sessions. Other network elements may generate and/or store usage records for other types of communication sessions. For example, IM server 38 may generate usage records for instant messaging sessions. Similarly, network elements connected to PSTN 22, such as MSC 20, may also generate usage records, which may be described as call detail records (CDRs). As shown in FIG. 5, one or more systems, such as mediation system 300, may collect usage records from some or all of the network elements that generate and/or store usage records, for billing or other purposes. Mediation system 300 may re-format, correlate, and/or combine the usage records to produce data records for other systems. In particular, mediation system 300 may provide data records to a billing system 302. Billing system 302 calculates charges for users based on the data records from mediation system 300, which, in turn, are based on usage records from AAA server 32 and/or other network elements. Billing system 302 may use different billing formulas to calculate charges for different session types. Billing system 302 determines the session type, and, thus, what billing formula to use, from the user identifiers included in the data records by way of the usage records.

In this way, different user identifiers for different session types can facilitate the use of different billing formulas for different session types. Moreover, this approach can also be used in packet-switched networks for non-wireless communication. In addition, although the approach is particularly useful for billing purposes, the correlation between user identifier and session type can be used for other purposes and/or by other network elements.

CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of communicating over a packet-switched network, said method comprising:
   a wireless communication device receiving an instruction to establish a communication session over said packet-switched network on behalf of a user, said communication session having a session type;
   said wireless communication device selecting, based at least in part on said session type, one of a plurality of user identifiers associated with said user, wherein said plurality of user identifiers comprises a first user identifier and a second user identifier, wherein said first user identifier is selected if said session type is a first session type and said second user identifier is selected if said session type is a second session type, and wherein said first session type is a real-time media session and said second session type is other than a real-time media session;
   establishing said communication session using said selected user identifier to identify said user.

2. The method of claim 1, wherein establishing said communication session comprises:
   transmitting, over an air interface, at least one message including said selected user identifier.

3. The method of claim 1, further comprising:
   said user using said wireless communication device to engage in a real-time media session, said user being identified by said first user identifier in said real-time media session, wherein said communication device receives only packets related to said real-time media session during said real-time media session.

4. The method of claim 1, further comprising:
   said user using said wireless communication device to engage in a real-time media session, said user being identified by said first user identifier in said real-time media session, wherein said communication device does not receive packets associated with said second user identifier during said real-time media session.

5. The method of claim 1, wherein said first and second user identifiers are network access identifiers.

6. The method of claim 5, wherein said first user identifier is a network access identifier with a first realm and said second user identifier is a network access identifier with a second realm.

7. The method of claim 1, further comprising:

generating at least one usage record for said communication session, said at least one usage record including said selected user identifier.

8. A wireless communication device comprising:

a user interface for receiving an instruction to establish a requested communication session over a packet-switched network on behalf of a user, said requested communication session having a requested session type;

data storage storing a plurality of user identifiers associated with said user;

selection logic for selecting one of said plurality of user identifiers, based at least in part on said requested session type, wherein said plurality of user identifiers associated with said user includes a first user identifier that indicates a first session type and a second user identifier that indicates a second session type, and wherein said selection logic selects said first user identifier if said requested session type is said first session type and selects said second user identifier if said requested session type is said second session type; and at least one application for establishing said requested communication session of said requested session type, wherein said at least one application uses said selected user identifier to identify said user for said requested communication session, and wherein said at least one application includes a first application for establishing communication sessions of said first session type and a second application for establishing communication sessions of said second session type.

9. The wireless communication device of claim 8, wherein establishing said requested communication session comprises:

said wireless communication device transmitting at least one message over an air interface, said at least one message including said selected user identifier.

10. The wireless communication device of claim 8, wherein said first session type is a real-time media session and said second session type is other than a real-time media session.

11. A method of obtaining session type information, said method comprising:

establishing a communication session over a packet-switched network on behalf of a user, said communication session having a session type;

obtaining a user identifier that identifies said user for said communication session;

determining said session type from said user identifier;

selecting, based at least in part on said session type determined from said user identifier, one of a plurality of billing formulas; and using said selected billing formula to calculate a charge to said user for said communication session.

12. The method of claim 11, wherein said user identifier includes a first field that identifies said user and a second field that indicates said session type.

13. The method of claim 11, wherein obtaining a user identifier that identifies said user for said communication session, comprises:

receiving at least one message from a wireless communication device associated with said user, said at least one message including said user identifier.

14. The method of claim 11, further comprising:

generating at least one usage record related to said communication session, said at least one usage record including said user identifier.

15. The method of claim 14, further comprising:

calculating said charge to said user for said communication session based, at least in part, on information contained in said at least one usage record, said information including said user identifier.

16. The method of claim 1, wherein said real-time media session is a push-to-talk (PTT) session.

17. The method of claim 14, wherein at least one of said at least one usage record is a Usage Data Record (UDR).

18. The method of claim 14, further comprising:

transmitting said at least one usage record to an accounting server.

19. The method of claim 18, wherein said at least one usage record is transmitted in a RADIUS accounting message.

* * * * *